O. C. BROWN.
Apparatus for Loading and Unloading Baggage and Freight from Cars.
No. 138,557. Patented May 6, 1873.
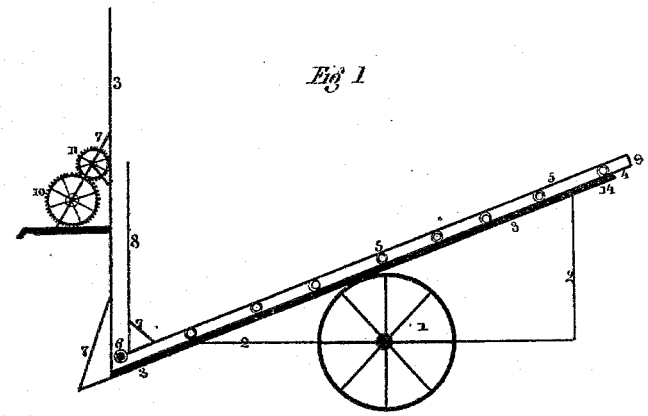
Fig. 1
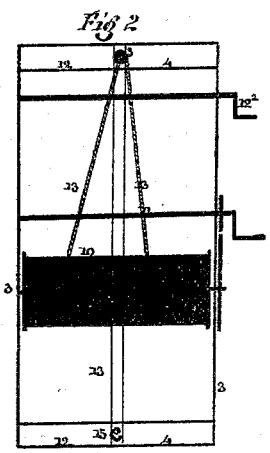
Fig. 2
Fig. 3
Witnesses
John B Garberson
Julia Garberson
Inventor
O. C. Brown

UNITED STATES PATENT OFFICE.

ORLANDO C. BROWN, OF IBERIA, OHIO.

IMPROVEMENT IN APPARATUS FOR LOADING AND UNLOADING BAGGAGE AND FREIGHT FROM CARS.

Specification forming part of Letters Patent No. 138,557, dated May 6, 1873; application filed November 1, 1872.

*To all whom it may concern:*

Be it known that I, ORLANDO C. BROWN, of Iberia, in the county of Morrow and State of Ohio, have invented certain improvements in combined elevating, baggage loading, and unloading apparatus, of which the following is a specification:

My invention relates to the combination of power by use of wheels and pulleys with a hinged track at one end and movable at the other and attached to frame part of the ordinary truck upon which runs a rolling truck or second truck: First, the object of my invention is to change the mode of lifting baggage by hand to lifting by other power from truck to cars or other vehicles; second, to save time; third, to avoid breaking or damaging trunks or other baggage in the act of transfer.

Figure 1 is a side view of my truck ready for loading. Fig. 2 is an end view showing both positions of the track when down and ready for loading, and up and in position to be used for unloading, showing also the mechanism by which the track, truck, and baggage are raised to form an inclined plane which runs the truck by throwing off pawl from ratchet-wheel, all of which will be the more readily understood by reading the following more particular specification. Fig. 3 is a modified form of the device, all numbers having reference to like parts in each figure.

1 are the wheels, of the size and kind to suit, with their axle, on which rests a frame of substantial construction, marked 2 3 7, and securely fastened on said axle. 4 is the outside parts of a movable frame, at one end on stationary frame, and hinged to it at 14. This frame so hinged forms a track for rollers or wheels, marked 9, to run on. 5 and 8 are the rolling or upper truck on wheels on track 4. The rolling truck is kept to its place on track by flanges on wheels 9 in manner similar to railroad car-wheels. 7 are braces in frame-work to strengthen it; 10, drum-wheel and its axle; 11, pinion, axle, drum, and crank; the pinion being cogged to receive a pawl to hold the rolling truck at any given point of height by means of rope 13, and also to work the drum 10 when power is applied at the handle. 10 11, with ropes and pulleys 13, forms a lifting-jack, such as in common use. 6 are friction-rollers in the end of frame-pieces 5 to bear against frame 3, preventing too great friction when heavily loaded while being raised from first position, marked 4 and 12 at the bottom of Fig. 2, to the second position at the top of Fig. 2, marked 12 and 4, fully seen in Figs. 1 and 3 at 4, where the two positions of track are seen with truck on it. 15 is a hook on pulley-block to hook into steeple in 4 to raise the track, bearing on it truck and baggage. $12^2$ is a single-wheel axle-drum and pawl, with rope 16 attached to rolling truck to prevent a too rapid descent down inclined-plane track when in position, as shown in Fig. 3; also, to be used to draw back truck when needed. $12^2$ is also shown attached near the top of end frame in Fig. 2; either arrangement can be chosen, as both are complete. 14 is a hinge, of any suitable character, to admit of the raising and lowering of the end of the track 4, on which sits rolling car or truck 5.

From this description it is quite evident, if power be applied at crank 11, the hinged track with truck or car and baggage can be raised and lowered at will, forming an inclined plane either forward or backward, on which will run the truck 5. The track 4 being longer than frame 3, the end of track reaches over so that when it is raised it forms an inclined plane forward, and the track will rest in or on floor of car or wagon into which baggage is to be delivered, forming a continued track to the point baggage is to be delivered, thus accomplishing the object declared.

I make no claim on the frame 2 3 7 with wheels 1 and their axle. They are not new; but—

I claim as my invention—

1. The combination of a track, 4, with hinge 14 fastened to frame of lower truck 2 3 7, substantially as and for the purposes hereinbefore set forth.

2. The combination of a lifting-jack, marked 10, 11, and 13, arranged in frame 3, in combination with track 4, substantially as and for the purposes hereinbefore set forth.

3. The combination of a drum-wheel, axle, and handle $12^2$ on end of track 4, substantially as described.

4. The combination of friction-rollers 6 to operate against frame 3, substantially as described.

5. The combination of double truck with track 4 between them, to operate as described.

ORLANDO C. BROWN.

Witnesses:
 M. C. CRANE,
 JESSE PAXTON.